United States Patent [19]
Cole, Jr. et al.

[11] Patent Number: 6,102,424
[45] Date of Patent: Aug. 15, 2000

[54] TRAILER HITCH BALL COVER

[76] Inventors: Bert James Cole, Jr., 2918 Lantana Lakes Dr. West, Jacksonville, Fla. 32246; James Harden, 1309 Palm Cir., Jacksonville Beach, Fla. 32250

[21] Appl. No.: 09/057,427

[22] Filed: Apr. 8, 1998

[51] Int. Cl.[7] .................... B60D 1/60; B60D 1/62
[52] U.S. Cl. .................... 280/507; 280/422; 150/166
[58] Field of Search .................... 280/422, 507, 280/504; 439/35, 36; D12/162; 150/166, 155; 296/136

[56] References Cited

U.S. PATENT DOCUMENTS

| | | | |
|---|---|---|---|
| D. 344,257 | 2/1994 | Eppard | D12/162 |
| 3,059,073 | 10/1962 | French, Jr. | 280/422 |
| 3,836,843 | 9/1974 | Yonce | 439/36 |
| 4,283,072 | 8/1981 | Deloach, Jr. | 280/422 |
| 4,348,035 | 9/1982 | Wasservogel | 280/422 |
| 5,593,170 | 1/1997 | Chiu | 280/422 |
| 5,681,053 | 10/1997 | Misukanis et al. | 280/507 |

*Primary Examiner*—Brian L. Johnson
*Assistant Examiner*—Avraham Lerner
*Attorney, Agent, or Firm*—Steven R. Scott

[57] ABSTRACT

A removable cover for towing balls featuring, in its preferred embodiments: (a) a towing ball hitch cover; (b) locking apparatus for maintaining said towing ball hitch cover engaged on said towing ball and/or for preventing its unauthorized removal and theft; and (c) electrically operative apparatus capable of being plugged into a trailer plug connector and responsive to electrical current received therefrom.

8 Claims, 2 Drawing Sheets

TRAILER HITCH BALL COVER

BACKGROUND

1. Field of the Invention

The instant invention pertains to trailer hitch balls. More specifically, it pertains to covers for such trailer hitch balls. Trailer hitch balls are almost universally utilized for trailer hitch purposes. These balls are subject to rust, wear and deterioration if not protected from weather and other damaging factors in the environment.

2. Prior Art in the Field

A variety of trailer hitch ball covers have been developed in the past. Representative examples of such prior art devices may be found in the following U.S. Patents:

(a) U.S. Pat. No. 3,228,445, for Trailer Hitch Ball Covers issued to Mayotte in 1966.

(b) U.S. Pat. No. 3,596,926, for a Trailer Hitch Cover issued to Randall in 1971.

(c) U.S. Pat. No. 4,738,293, for a Ball Hitch Cover issued to Ostrom in 1988.

(d) U.S. Pat. No. Des. 317,890, for a Trailer Hitch Cover issued to Bachmann in 1991.

(e) U.S. Pat. No. Des. 344,257, for a Trailer Hitch Cover issued to Eppard in 1994.

(f) U.S. Pat. No. Des. 358,794, for a Trailer Ball Hitch Cover Kit issued to Thigpen in 1995.

However, none of these devices feature means for interfacing with and/or utilizing the trailer light connections inevitably required for towing purposes and capable of use in conjunction with a trailer hitch ball cover.

SUMMARY AND OBJECTS OF THE INVENTION

The instant invention features, in its preferred embodiments: (a) towing ball hitch cover means; (b) locking means for maintaining said towing ball hitch cover means engaged on said towing ball and/or for preventing its unauthorized removal and theft; and (c) electrically operative means capable of being plugged into a trailer plug connector and responsive to electrical current received therefrom. These features are ideally combined in a device that is compact and easily manufactured from materials well known to those of ordinary skill in the art of automotive accessory manufacture. The addition of electrically responsive elements (which will generally take the form of electrical lamps) make use of a hitherto wasted feature—the ubiquitous presence of trailer plug connectors. Trailer plug connectors are normally utilized for connection of trailer brake/turn signal lights to the electrical system of the towing vehicle. However, when not in use, these connectors generally dangle in the vicinity of the trailer hitch ball, where they are subject to damage and corrosion and their potential remains unrealized. The instant design provides means for helping to protect such plugs from damage by maintaining them as part of a sheltered electrical connection. Moreover, in the preferred embodiments described herein they are connected to electrical lamps responsive to left, right, and brake light signals and therefore serve to reinforce same. Finally, in the preferred embodiments described, they are advantageously coupled with a decorative design, making for a unique and novel feature attractive to many vehicle owners.

DETAILED DESCRIPTION OF THE PREFERRED EMBODIMENT

Figure 1:
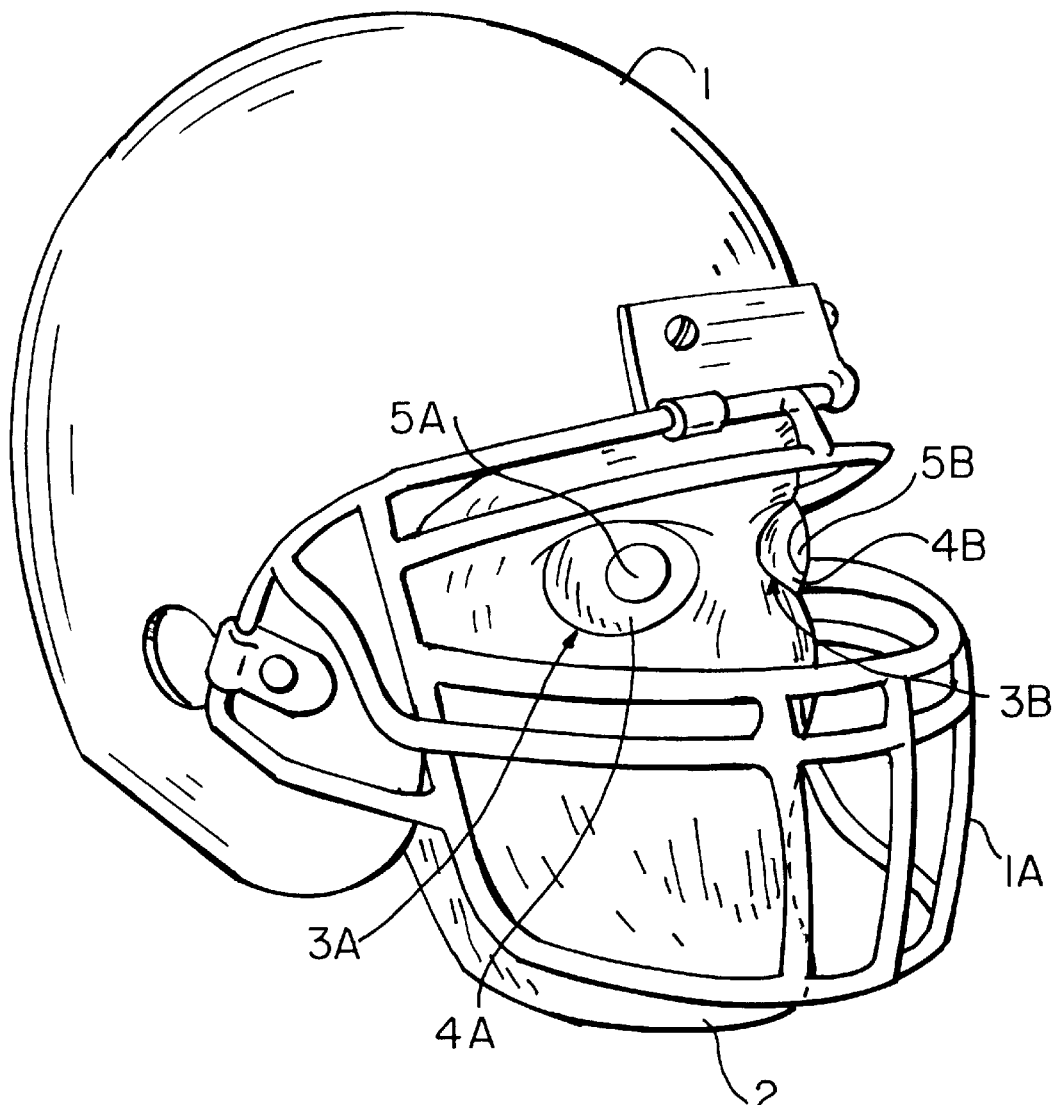
FIG. 1 provides a perspective view of a preferred embodiment of the instant invention.

As will be noted from FIG. 1, which provides a perspective view of a preferred embodiment of the instant invention, a trailer hitch ball cover in a accordance with the teachings of this invention may take a novel or decorative shape. The embodiment illustrated features a helmet 1 which is a scale imitation of a football helmet with an integral face mask 1A and face plate 2. The face plate 2 features two translucent, preferably colored, lamp covers, a left lamp cover (denoted generally by arrow 3A) and a right lamp cover (denoted generally by arrow 3B). Left lamp cover 3A has a translucent left red section 4A surrounding a translucent left amber section 5A. Right lamp cover 3B likewise has a translucent right red section 4A surrounding a translucent right amber section 5B. From a manufacturing standpoint, it will be noted that all of these features can be easily and simply formed from rigid plastics utilizing techniques well known in the mechanical arts and known to those of the ordinary level of skill in the manufacture of automotive accessory items.

Figure 2:
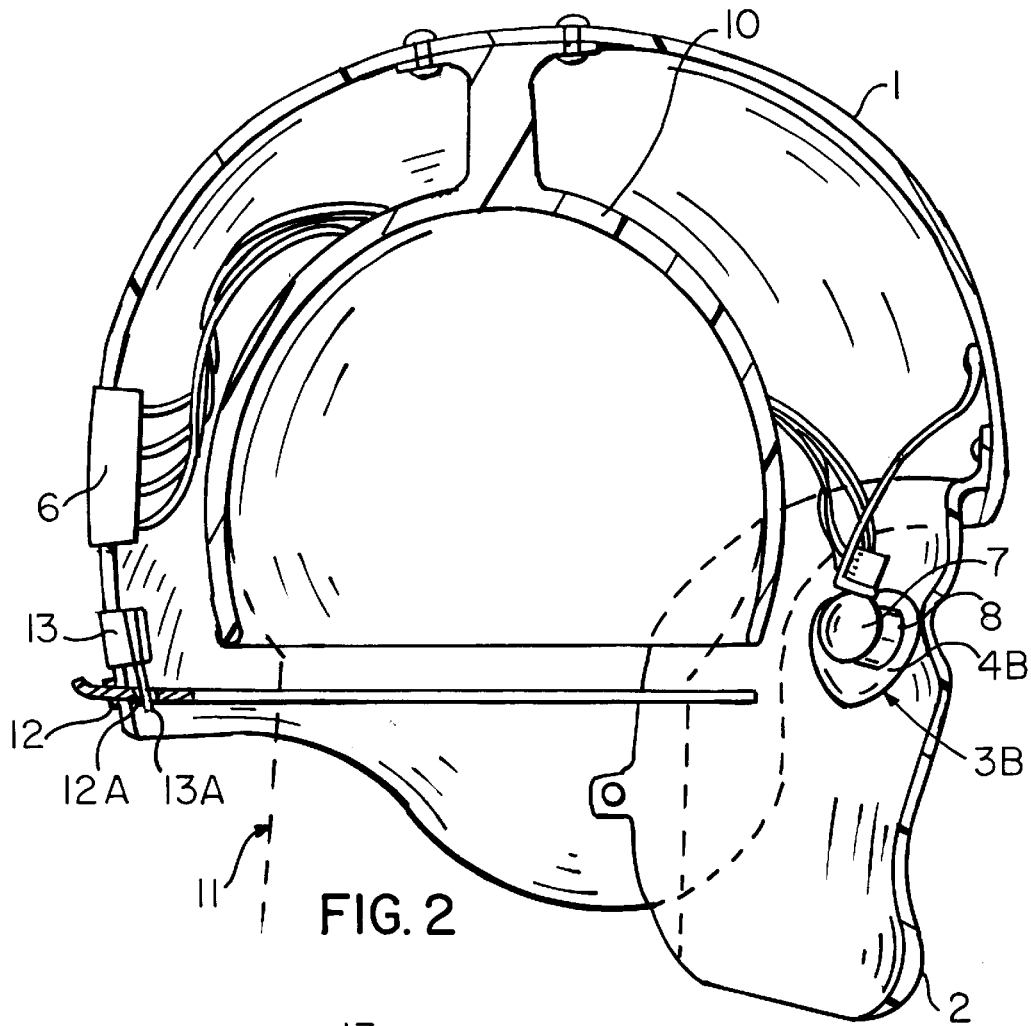
FIG. 2 provides a cross-sectional view from the side of a preferred embodiment of the instant invention.
Figure 3:
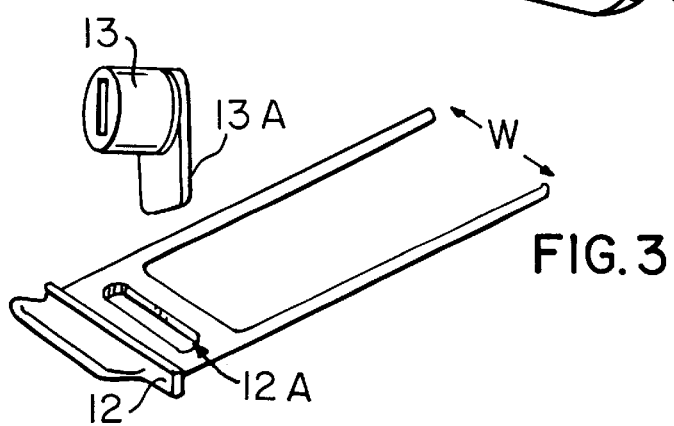
FIG. 3 provides a view of the locking member and lock combination considered advantageous for use with the instant invention.

A more in depth understanding of the invention and its operative elements can be acquired from review of FIG. 2, which provides a cross-sectional view from the right side of the preferred embodiment illustrated in FIG. 1. As will be noted, the trailer hitch ball cover has a trailer hitch ball engaging socket 10 which should preferably be formed from semirigid plastic materials and is sized to fit a standard trailer hitch ball (which is shown for illustrative purposes only and denoted generally by arrow 11). It is also provided with a locking member 12 and a lock 13 capable of securing said locking member in position. Locking member 12 can advantageously take the form of an insertable member of the type illustrated in FIG. 3, which slides into a slot at the rear of the helmet 1 and has a width "w" narrower than the width of the trailer hitch ball 11, but wide enough to slide around the supporting member for said trailer hitch ball 11. Lock 13 is of the type featuring a rotating tab 13A which, in its locked position, engages a slot (denoted by arrow 12A) in locking member 12, preventing locking member 12 from being withdrawn from its position, thereby blocking removal of the invention from trailer ball hitch 11.

Also penetrating helmet 1 is a plug socket 6 for receiving the brake/turn signal plug connected to the vehicle's electrical turn/brake light system. The brake light wire and ground wire are attached to at least one centrally located brake lamp 7 (comprised of a bulb/socket combination) which, when illuminated, shines through both right red section 4A and left red section 4B. Right lamp 8 is wired to the right turn signal wire and ground wire. It features an opaque reflector, which is preferably shaped like a parabolic mirror and is coated with reflective material on its inside, that covers right amber section 5B and assures that no light emitted by brake lamp 7 will shine through right amber section 5B. Right lamp 8 is also provided with a bulb on its inside so as to function in like manner to a flashlight bulb with reflector combination. A similar arrangement is provided with regard to left amber section 5A.

As will be appreciated, the aforesaid arrangement links the illumination of the translucent sections named to the brake and turn signals of the vehicle, creating interesting as well as utilitarian effects. However, the preferred embodiment's use of right, left and brake lamps linked and responsive to, respectively, right turn signals, left turn signals and braking signals should not be seen as a limit on the ambit of possibilities inherent in the instant invention. In its broadest sense, the instant invention requires only an electrically activated member attached to said cover member, which electrically activated member is adapted for connection and response to electrical current received via a trailer tail light connection plug. Such electrically activated members could, for example, be electromechanical in nature rather than electroluminescent. Thus, it is fully possible to have a different and unique design for a towing hitch ball cover where, for example the cover might be in the form of a figure with arms that could be raised on the right or the left in response to right and left turn signals (e.g. an electrical motor with spring biasing to the downward position on the arm could easily be utilized to raise an "arm" in response to an electrical current against the spring biasing force). Further, even where electro-luminescent, the electrically activated members could be placed in a variety of arrangements and be of a variety of shapes, numbers and colors. The design of the cover utilized, which in the preferred embodiment illustrated is provided with a decorative appearance in the form of a football helmet 1 with a quasi-human face plate 2 could also vary greatly. Thus, it could take the form of different helmets, faces or other things. It could also be equipped with a magnet or a simple clip in its base (either in lieu of or in addition to the towing hitch ball cover and connection means described with regard to the preferred embodiment) in order to allow it to be directly connected to the bumper or some other part of a vehicle rather than to a towing hitch ball. All of these design changes are possible by those of ordinary skill in the arts pertaining to automotive accessories and equipment. Thus, the scope and ambit of the inventive concept can be best determined by the claims that follow.

We claim:

1. A removable cover for towing ball hitches for covering the same when not in towing usage, comprising:

(a) at least one electrically activated signal generating member, which at least one electrically activated signal generating member is adapted for connection and response to electrical current received via a trailer tail light connection plug; and (b) a removable cover adapted for placement over a towing ball when not in towing use, which removable cover serves as means for attachment of said at least one electrically activated signal generating member to a vehicle's exterior.

2. A removable cover for towing ball hitches as described in claim 1, wherein said at least one electrically activated signal generating member is comprised of a first electrically activated signal generating member responsive to a left tail light turn signal received via a trailer tail light connection plug and a second electrically activated signal generating member responsive to a right tail light turn signal received via a trailer tail light connection plug.

3. A removable cover for towing ball hitches as described in claim 1, wherein said at least one electrically activated signal generating member is comprised of a brake actuated electrically activated signal generating member responsive to a brake light signal received via a trailer tail light connection plug.

4. A removable cover for towing ball hitches as described in claim 2, wherein said at least one electrically activated member is further comprised of a brake actuated electrically activated signal generating member responsive to a brake light signal received via a trailer tail light connection plug.

5. A removable cover for towing balls as described in claim 1, wherein said at least one electrically activated signal generating member is comprised of at least one electric light.

6. A removable cover for towing balls as described in claim 2, wherein said at least one electrically activated signal generating member is comprised of at least one electric light.

7. A removable cover for towing balls as described in claim 3, wherein said at least one electrically activated signal generating member is comprised of at least one electric light.

8. A removable cover for towing balls as described in claim 4, wherein said at least one electrically activated signal generating member is comprised of at least one electric light.

* * * * *